(12) United States Patent
Bernardon et al.

(10) Patent No.: US 11,775,697 B2
(45) Date of Patent: Oct. 3, 2023

(54) SHOE DESIGN THROUGH 2.5-DIMENSIONAL SHOE MODELS

(71) Applicant: Siemens Industry Software Inc., Plano, TX (US)

(72) Inventors: Edward Bernardon, Bedford, MA (US); Kelvin Juarbe, Roslindale, MA (US)

(73) Assignee: Siemens Industry Software Inc., Plano, TX (US)

( * ) Notice: Subject to any disclaimer, the term of this patent is extended or adjusted under 35 U.S.C. 154(b) by 222 days.

(21) Appl. No.: 16/482,433

(22) PCT Filed: Sep. 4, 2018

(86) PCT No.: PCT/US2018/049329
§ 371 (c)(1),
(2) Date: Jul. 31, 2019

(87) PCT Pub. No.: WO2019/067169
PCT Pub. Date: Apr. 4, 2019

(65) Prior Publication Data
US 2020/0004893 A1    Jan. 2, 2020

Related U.S. Application Data

(60) Provisional application No. 62/563,121, filed on Sep. 26, 2017.

(51) Int. Cl.
*G06F 30/00*     (2020.01)
*A43D 8/26*      (2006.01)
(Continued)

(52) U.S. Cl.
CPC .............. *G06F 30/00* (2020.01); *A43D 8/26* (2013.01); *G06T 17/00* (2013.01); *G06F 2111/20* (2020.01); *G06F 2113/12* (2020.01)

(58) Field of Classification Search
CPC ....... A43D 8/26; G06F 30/00; G06F 2113/12; G06F 2111/20; G06T 17/00
See application file for complete search history.

(56) References Cited

U.S. PATENT DOCUMENTS

| 9,147,279 B1* | 9/2015 | Bruce | G06T 15/04 |
| 2013/0124156 A1* | 5/2013 | Wolper | G06T 17/00 |
| | | | 703/1 |
| 2018/0350132 A1* | 12/2018 | Paulson | G06T 17/10 |
| 2019/0368085 A1* | 12/2019 | Morgan | D04B 1/102 |

FOREIGN PATENT DOCUMENTS

| CA | 2094223 | 10/1993 |
| CN | 1895118 | 1/2007 |
| (Continued) |

OTHER PUBLICATIONS

QS Shoemaster: "Shoemaster Power Demo Video", YouTube, Aug. 18, 2014, pp. 1-3, [Retrieved from the Internet: URL:https://web.archieve.org/web/20170224212156/http://www.desystem.com.tw/PatternElf_FlowChart_eng.html on Nov. 27, 2018], XP054978910.
(Continued)

*Primary Examiner* — Yu Chen

(57) ABSTRACT

Systems, methods, logic, and devices may support shoe design through 2.5-dimensional (2.5D) shoe models. In some examples, a system may include a 2D shoe shell pattern engine configured to access a 2D shoe shell pattern, the 2D shoe shell pattern generated for shoe design. The system may also include a 2.5D shoe model engine configured to generate a 2.5D shoe model by placing shoe design elements provided by a user onto the 2D shoe shell pattern of the shoe, including by adding 2.5D layering data for each shoe design element placed on the 2D shoe shell pattern to form the 2.5D shoe model, and wrap the 2.5D shoe model into a 3D shoe model for construction of a physical shoe from the 3D shoe model.

19 Claims, 6 Drawing Sheets

(51) Int. Cl.
*G06T 17/00* (2006.01)
*G06F 113/12* (2020.01)
*G06F 111/20* (2020.01)

(56) References Cited

FOREIGN PATENT DOCUMENTS

| CN | 1904899 | 1/2007 |
|---|---|---|
| CN | 101588736 | 11/2009 |
| DE | 102016001410 | 8/2017 |

OTHER PUBLICATIONS

Digital Evolution System: "Digital Evolution System PatternElf", Feb. 24, 2017, [Retrieved from the Internet: URL: https://web.archive.org/web/20170224212156/http:/www.desystem.com.tw/PatternElf_Flowchart_eng.html on Nov. 27, 2018], XP055527657.
Digital Evolution System: "Digital Evolution System ImagineElf3D", Feb. 24, 2017, 1 pg. [Retrieved from the Internet: URL:https://web.archive.org/web/20170224212123/http://www.desystem.com.tw:80/ImagineElf3D_Process_eng.html on Nov. 27, 2018], XP855527659.
Philip Azariadis et al, "An innovative virtual-engineering system for supporting integrated footwear design", International Journal of Intelligent Engineering Informatics, vol. 1, No. 1,Jan. 1, 2010, pp. 53-74, XP855527664.
PCT International Search Report and Written Opinion of International Searching Authority dated Dec. 20, 2018 corresponding to PCT International Application No. PCT/US2018/049329 filed Sep. 4, 2018.

\* cited by examiner

SHOE DESIGN THROUGH 2.5-DIMENSIONAL SHOE MODELS

CROSS REFERENCE TO RELATED APPLICATION

This application claims the benefit of priority to U.S. Provisional Application No. 62/563,121, filed on Sep. 26, 2017 and titled "SYSTEM AND METHOD FOR SHOE DESIGN UTILIZING 2.5D METHODS", which is incorporated herein by reference in its entirety.

BACKGROUND

Computer systems can be used to create, use, and manage data for products and other items. Examples of computer systems include computer-aided design (CAD) systems (which may include computer-aided engineering (CAE) systems), visualization and manufacturing systems, product data management (PDM) systems, product lifecycle management (PLM) systems, and more. These systems may include components that facilitate design and simulated testing of product structures.

SUMMARY

Disclosed implementations include systems, methods, devices, and logic that support shoe design through 2.5-dimensional (2.5D) shoe models.

In one example, a method may be performed, executed, or otherwise carried out by a computing system (e.g., a CAD system). The method may include accessing a 2-dimensional (2D) shoe shell pattern, generating a 2.5D shoe model by placing shoe design elements provided by a user onto the 2D shoe shell pattern of the shoe, the placing including adding 2.5D layering data for each shoe design element placed on the 2D shoe shell pattern to form the 2.5D shoe model, and wrapping the 2.5D shoe model into a 3-dimensional (3D) shoe model for construction of a physical shoe from the 3D shoe model.

In another example, a system may include a 2D shoe shell pattern engine and a 2.5D shoe model engine. The 2D shoe shell pattern engine may be configured to access a 2D shoe shell pattern, the 2D shoe shell pattern generated for shoe design. The 2.5D shoe model engine may be configured to generate a 2.5D shoe model by placing shoe design elements provided by a user onto the 2D shoe shell pattern of the shoe, including by adding 2.5D layering data for each shoe design element placed on the 2D shoe shell pattern to form the 2.5D shoe model, and wrap the 2.5D shoe model into a 3D shoe model for construction of a physical shoe from the 3D shoe model.

In yet another example, a non-transitory machine-readable medium may store instructions executable by a processor. Upon execution, the instructions may cause the processor or a computing system to access a 2D shoe shell pattern, the 2D shoe shell pattern generated for shoe design, generate a 2.5D shoe model by placing shoe design elements provided by a user onto the 2D shoe shell pattern of the shoe, including by adding 2.5D layering data for each shoe design element placed on the 2D shoe shell pattern to form the 2.5D shoe model, and wrap the 2.5D shoe model into a 3D shoe model for construction of a physical shoe from the 3D shoe model.

BRIEF DESCRIPTION OF THE DRAWINGS

Certain examples are described in the following detailed description and in reference to the drawings.

DETAILED DESCRIPTION

The discussion below refers to 2.5D shoe design. 2.5D design may refer to any 2.5-dimension or 2.5-dimensional perspective, data representation, or technique by which design elements with thickness or height data or overlaid on a 2D plane. In that regard, 2.5D designs may not be fully 3-dimensional (3D), and may instead be formed on a 2D plane with additional dimension (e.g., thickness or height) data.

The disclosure herein may provide systems, methods, devices, and logic for shoe design through 2.5D shoe models. In particular, the 2.5D shoe design features described herein may provide the ease and benefits of shoe design in 2D, but allow for tracking and representation of 3D elements that may subsequently be used to model a shoe in 3D to physically construct the shoe. The 2.5D shoe design features contemplated herein may track layers of shoe design elements placed onto a 2D shoe shell pattern, and associate thicknesses of the tracked layers. Such 2.5D tracking may support a subsequent wrapping of the 2.5D shoe design into a 3D shoe model.

By providing a 2D shoe design interface with tracked layer and thickness data, the 2.5D shoe design features described herein may provide a unique design capability in shoe development. Further benefits described herein may include accounting for material-specific distortions in dimension mapping from 3D to 2D or 2.5D, or vice versa. Moreover, through shoe design in 2.5D, the features described herein may provide the benefits of 3D CAD models, but via shoe design capabilities via a 2D design interface. Such a blend of design dimensions may provide a designer-friendly alternative to 3D CAD design, which can be complicated and unfamiliar for shoe designers, while nonetheless providing the benefits of 3D CAD models for visualizations, renderings, and product construction.

Figure 1:
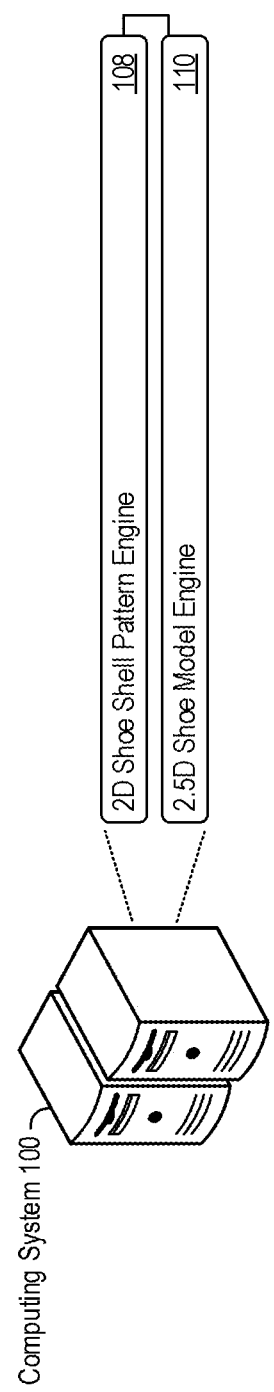
FIG. 1 shows an example of a computing system that supports shoe design through 2.5D shoe models.

FIG. 1 shows an example of a computing system 100 that supports shoe design through 2.5D shoe models. The computing system 100 may include a single or multiple computing devices such as application servers, compute nodes, desktop or laptop computers, smart phones or other mobile devices, tablet devices, embedded controllers, and more. In some implementations, the computing system 100 implements a CAD tool or CAD program through which a user may design and simulate testing of product structures, such as shoes or any other suitable footwear.

As described in greater detail herein, the computing system 100 may provide 2.5D shoe design capabilities. In that regard, the computing system 100 may generate or otherwise access a 2D shoe shell pattern upon which shoe design elements can be placed with corresponding thickness data, layer data, or any other data relevant to 2.5D shoe design, which may be referred to herein as 2.5D shoe model data. By tracking 2.5D shoe model data and forming 2.5D shoe models, the computing system 100 may allow designers to create shoe designs in a 2D plane while flexibly supporting construction of corresponding 3D shoe models for subsequent physical manufacture of designed shoes.

As an example implementation, the computing system 100 shown in FIG. 1 includes a 2D shoe shell pattern engine 108 and a 2.5D shoe model engine 110. The system 100 may implement the engines 108 and 110 (and components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the system 100 implements multiple engines using the same computing system features or hardware components (e.g., a common processor or a common storage medium).

In operation, the 2D shoe shell pattern engine 108 may access a 2D shoe shell pattern that is generated for shoe design. In operation, the 2.5D shoe model engine 110 may generate a 2.5D shoe model by placing shoe design elements provided by a user onto the 2D shoe shell pattern of the shoe, including by adding 2.5D layering data for each shoe design element placed on the 2D shoe shell pattern to form the 2.5D shoe model and wrap the 2.5D shoe model into a 3D model for construction of a physical shoe from the 3D shoe model.

These and other example 2.5 shoe design features according to the present disclosure are described in greater detail next. While many of the examples here are described specifically with respect to shoe design, a computing system or CAD tool may implement consistent features to support 2.5D design of any other product type.

Figure 2:
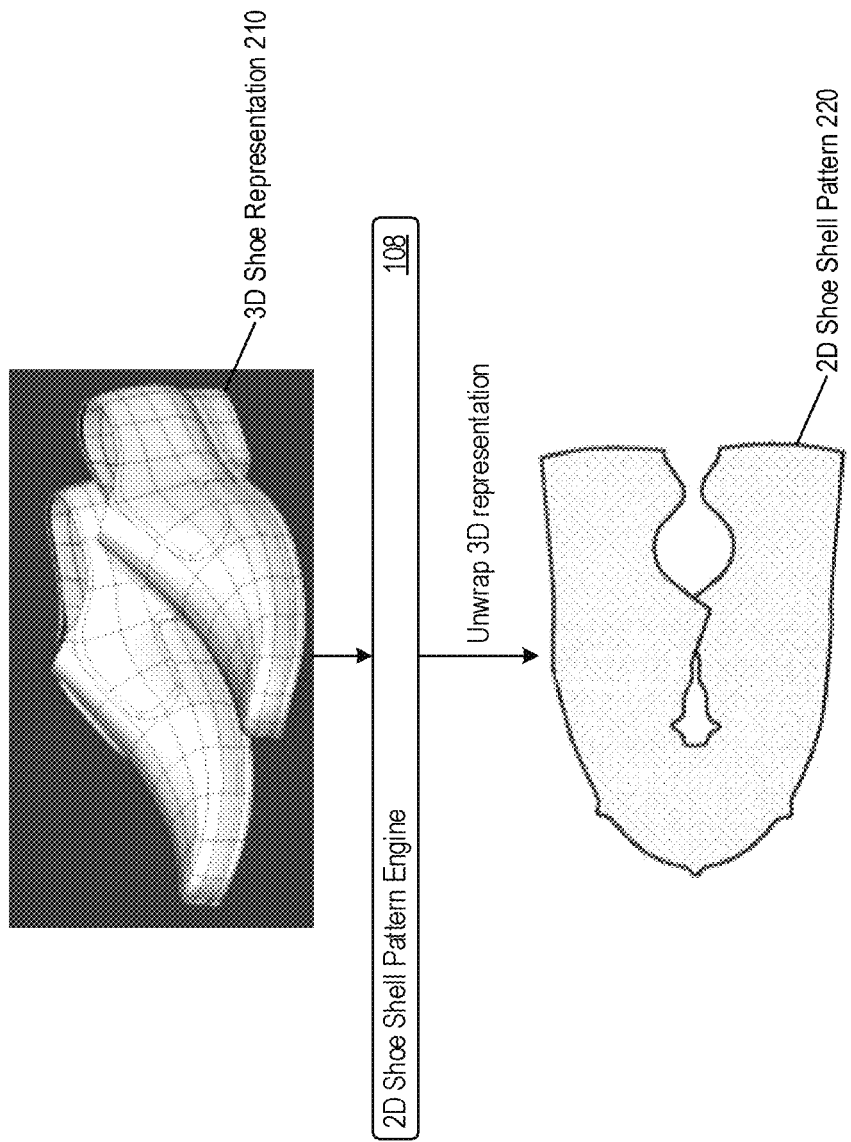
FIG. 2 shows an example of a shoe shell pattern access by a 2D shoe shell pattern engine.

FIG. 2 shows an example of a shoe shell pattern access by the 2D shoe shell pattern engine 108. A shoe shell pattern may provide a 2D shape on a 2D plane upon which shoe designers may lay out shoe design elements, such as surface materials, sew lines, laces, shoe parts, etc. As such, shoe shell patterns may be formed in a 2D shape that represents a flattened 3D shoe shape. The flattened shape of the 2D shoe shell pattern may represent an exterior shoe surface in 2D, allowing a shoe designer to identify and place shoe design elements at various points of the shoe surface via a 2D design interface.

In some implementations, the 2D shoe shell pattern engine 108 may access shoe shell patterns that are generated from a 3D shoe representation. For instance, the shoe shell pattern may be unwrapped and flattened from a 3D shoe representation. The shoe shell pattern may be generated by the 2D shoe shell pattern engine 108 itself, e.g., as illustrated in FIG. 2. In FIG. 2, the 2D shoe shell pattern engine 108 accesses a 3D shoe representation 210 from which the 2D shoe shell pattern engine 108 generates the 2D shoe shell pattern 220.

A 3D shoe representation 210 accessed by the 2D shoe shell pattern engine 108 may form a base volume or surface model from which a shoe is designed. As examples, the 3D shoe representation may be a baseline design accessed from a shoe design database or a 3D model of a previous shoe generation. To generate the 2D shoe shell pattern, the 2D shoe shell pattern engine 108 may transform the 3D shoe representation 210 into a 2D representation in such a way that the surface of the 3D shoe representation 210 is mapped unto a 2D plane. Such a 3D-to-2D mapping process may be referred to as an "unwrapping" process, as the 2D shoe shell pattern may, in effect, be unwrapped from the surface of the 3D shoe representation 210 and projected the 3D surface onto a 2D plane, which may form the 2D shoe shell pattern.

In some examples, the 2D shoe shell pattern engine 108 accounts for the material properties of any shoe materials represented in the 3D shoe representation 210. As such, the 2D shoe shell pattern engine 108 may generate the 2D shoe shell pattern by flattening a 3D shoe representation 210 into the 2D shoe shell pattern 220 such that the flattening accounts for distortion caused by flattening a shoe material included in the 3D shoe representation 210. Such accounting may include adjusting the perimeter, shape, pattern, or other geometric characteristic of the 2D shoe shell pattern 220 to address distortions caused by flattening a material into a 2D representation.

In doing so, the 2D shoe shell pattern engine 108 may apply any number of fiber recognition or flattening simulation techniques to identify and account for such material-based distortions. As such, the 2D shoe shell pattern engine 108 may account for complex 3D-to-2D flattening characteristics that may distort a flattening operation based on the curvature, material, or other characteristic of the 3D shoe representation 210. In some examples, the 2D shoe shell pattern engine 108 may implement or use a material-based flattener of a CAD tool to generate the 2D shoe shell pattern. By accounting for material-based distortions, the 2D shoe shell pattern 220 may be generated with increased accuracy, in that resulting 2.5D shoe models designed from the 2D shoe shell pattern 220 may be more easily or accurately transformed in a 3D shoe model for physical shoe manufacture.

The 2D shoe shell pattern 220 or any accessed shoe shell patterns may form a 2D base upon which the 2.5D shoe model engine 110 may generate a 2.5D shoe model. Example designs of 2.5D shoe models upon a 2D shoe shell pattern are described next in regard to FIG. 3.

Figure 3:
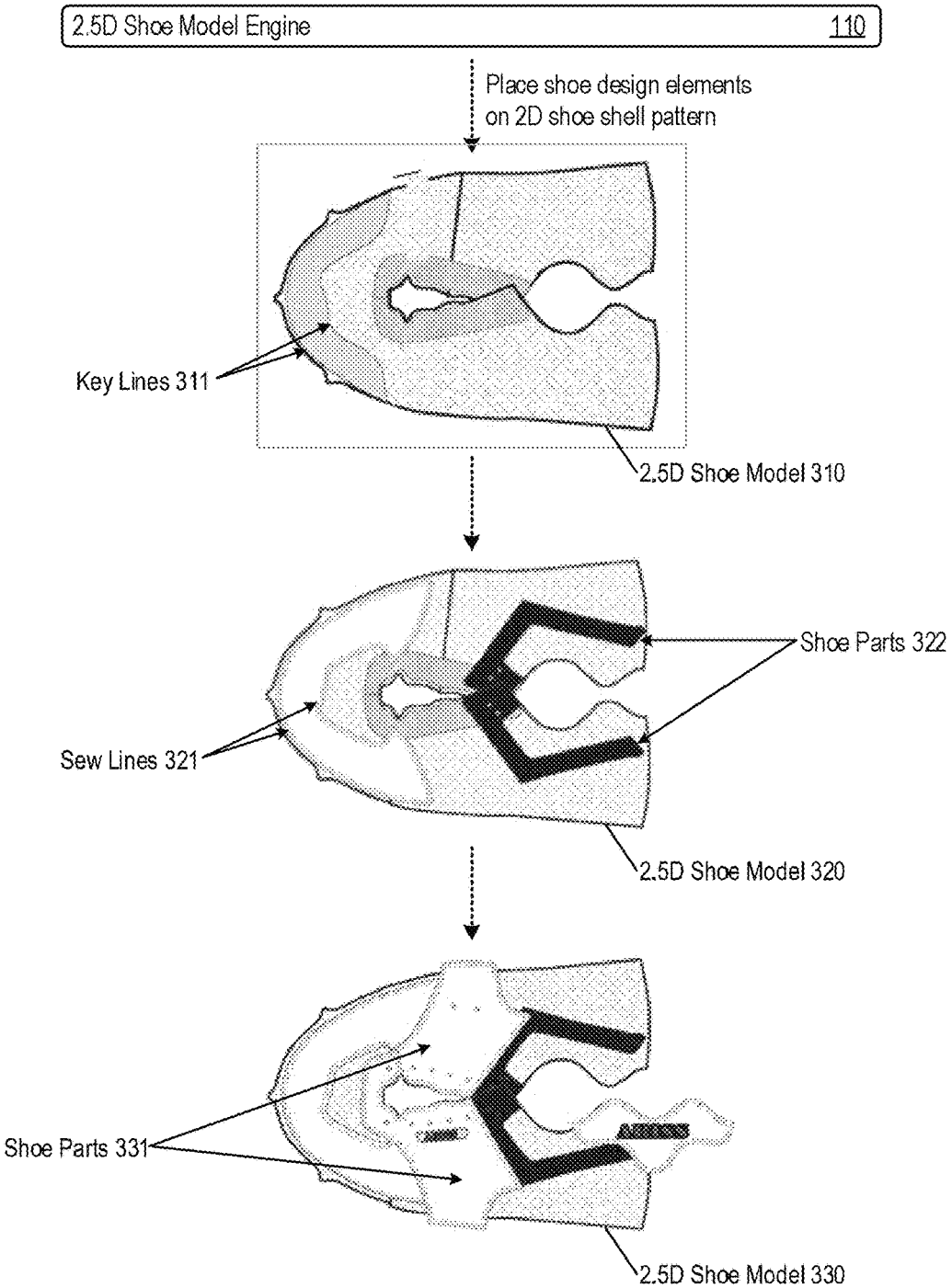
FIG. 3 shows examples of shoe design elements that a 2.5D shoe model engine may place on a 2D shoe shell pattern to generate 2.5D shoe models.

FIG. 3 shows examples of shoe design elements that the 2.5D shoe model engine 110 may place on a 2D shoe shell pattern to generate 2.5D shoe models. In obtaining and placing shoe design elements onto 2D shoe shell patterns, the 2.5D shoe model engine 110 may construct a 2.5D shoe model that can be mapped into a 3D representation for subsequent design or manufacture. The 2.5D shoe model engine 110 may support placement of any number of shoe design elements onto a 2D shoe shell pattern, which may include maintaining thickness data, material data, layering data, or any other 2.5D shoe model data relevant to representing a designed shoe. By doing so, the 2.5D shoe model engine 110 may provide shoe design capabilities in a 2D plane (e.g., via a 2D design interface with the 2D shoe shell pattern) while tracking the relevant 2.5D shoe design data utilized for subsequent 3D mapping and 3D modeling.

The 2.5D shoe model engine 110 may identify shoe design elements to be placed onto a 2D shoe shell pattern based on user inputs. In that regard, the 2.5D shoe model engine 110 may provide a framework or 2D design interface by which a user (e.g., a shoe designer) may add shoe design elements to a 2D shoe shell pattern. For instance, the 2.5D shoe model engine 110 may provide a library of shoe design elements to select from for insertion into a shoe design, such as shoe parts, materials, plastics, logos, fabrics, laces, and more. Additionally or alternatively, the 2.5D shoe model engine 110 may provide capabilities to add shoe design elements by freehand, e.g., by manual drawing of lines, curves, designs, etc.

For a given shoe design element input by a user or identified by the 2.5D shoe model engine 110, the 2.5D shoe model engine 110 may place the given shoe design element onto the 2D shoe shell pattern. Since various shoe design elements may be stacked on top of other shoe design elements during shoe design, placement by the 2.5D shoe model engine 110 onto the 2D shoe shell pattern may include placing of shoe design elements on top of other shoe design elements (that are directly or indirectly on top of the 2D shoe shell pattern).

As noted herein, each placed shoe design element may include relevant 2.5D shoe model data associated with the shoe design element. Such 2.5D shoe model data may include thickness data, material data, curvature data, styling data, or other applicable data for a given shoe design element placed on the 2D shoe shell pattern. Thickness data may refer to a thickness of a shoe design element, and may include various thicknesses at different parts of the shoe design element (e.g., varying thicknesses of a curved plastic toe piece). Material data may specify a particular material or material type of a shoe design element. Curvature data or styling data may specify various geometric characteristics or properties of shoe design elements, which may, for example, define a element shape or embedded logo for the shoe design element.

As another specific example, the 2.5D shoe model engine 110 may track layering data for a 2.5D shoe model. Layering data may specify a particular design layer that a placed shoe design element is located within. Put another way, the 2.5D shoe model engine 110 may track the layering of various shoe design elements placed onto the 2D shoe shell pattern, thus allowing 2.5D shoe model engine 110 to identify stacking or sequencing of shoe design elements in a shoe design. This may be relevant for the 2.5D shoe design features described herein, as the 2.5D shoe model engine 110 may be spatially-aware of 3D properties of a shoe design, even though shoe design elements are input and placed on a 2D plane. In combination with thickness data tracked by that 2.5D shoe model engine 110, 2.5D shoe models generated by the 2.5D shoe model engine 110 may allow design on 2D planes that can be efficiently and accurately ported into a 3D representation for use in physical shoe construction (or subsequent design or touch-ups).

To provide an illustrative example, FIG. 3 shows various states of a 2.5D shoe model as different shoe design elements are placed onto a 2D shoe shell pattern. In the 2.5D shoe model 310 shown in FIG. 3, the 2.5D shoe model engine 110 places various key lines onto a shoe shell pattern, such as the key lines 311. A key line may refer to any line or delineation for parts of a shoe. As such, placed key lines may define certain shoe parts that are placed onto the 2D shoe shell pattern. Upon placement of the key lines 311 (or a corresponding shoe part), the 2.5D shoe model engine 110 may identify corresponding material data, thickness data, layering data, or other 2.5D shoe model data for the placed shoe design element.

Continuing the illustration shown in FIG. 3, the 2.5D shoe model 320 shows further placement of shoe design elements by the 2.5D shoe model engine 110, including the sew lines 321 and shoe parts 322. The sew lines 321 may define locations at which thread is sewed into the shoe to secure another shoe part and the shoe parts 322 may include other physical elements added to a shoe design as represented by the 2.5D shoe model 320.

Note that the 2.5D shoe model 320 includes various shoe design elements placed by the 2.5D shoe model engine 110 on top of the 2D shoe shell pattern, other previously placed shoe design elements (e.g., as shown in the 2.5D shoe model 310), or a combination of both. As discussed above, the 2.5D shoe model engine 110 may track various layers at which shoe design elements. 2.5D shoe models may thus provide layer sequence or stacking-aware information, which may be useful in mapping the 2.5D model into three dimensions.

Referring again to the illustration shown in FIG. 3, the 2.5D shoe model 330 may further show placements of shoe design elements subsequent to those of the 2.5D shoe models 320 and 310. Layered upon previously (or lower-placed) shoe design elements, the 2.5D shoe model 330 depicts other shoe parts added onto the 2.5 shoe model, including the shoe parts 331.

The 2.5D shoe models 310, 320, and 330 may depict illustrative snapshots of a 2.5D shoe model constructed by the 2.5D shoe model engine 110 during a shoe design process. Some example shoe design elements are presented in FIG. 3, but various other shoe design elements are contemplated herein as well. 2.5D shoe models generated by the 2.5D shoe model engine 110 may thus be constructed on a 2D platform or 2D design interface, with a 2D shoe shell pattern forming a base for such designs. In providing 2D design interface capabilities, the 2.5D shoe model engine 110 may track thickness, layering, material, and any other 2.5D shoe model data for placed shoe design elements, which may result in generation of an intelligent shoe representation to increase the efficiency and ease by which a subsequent 3D CAD model of a shoe can be generated.

Figure 4:
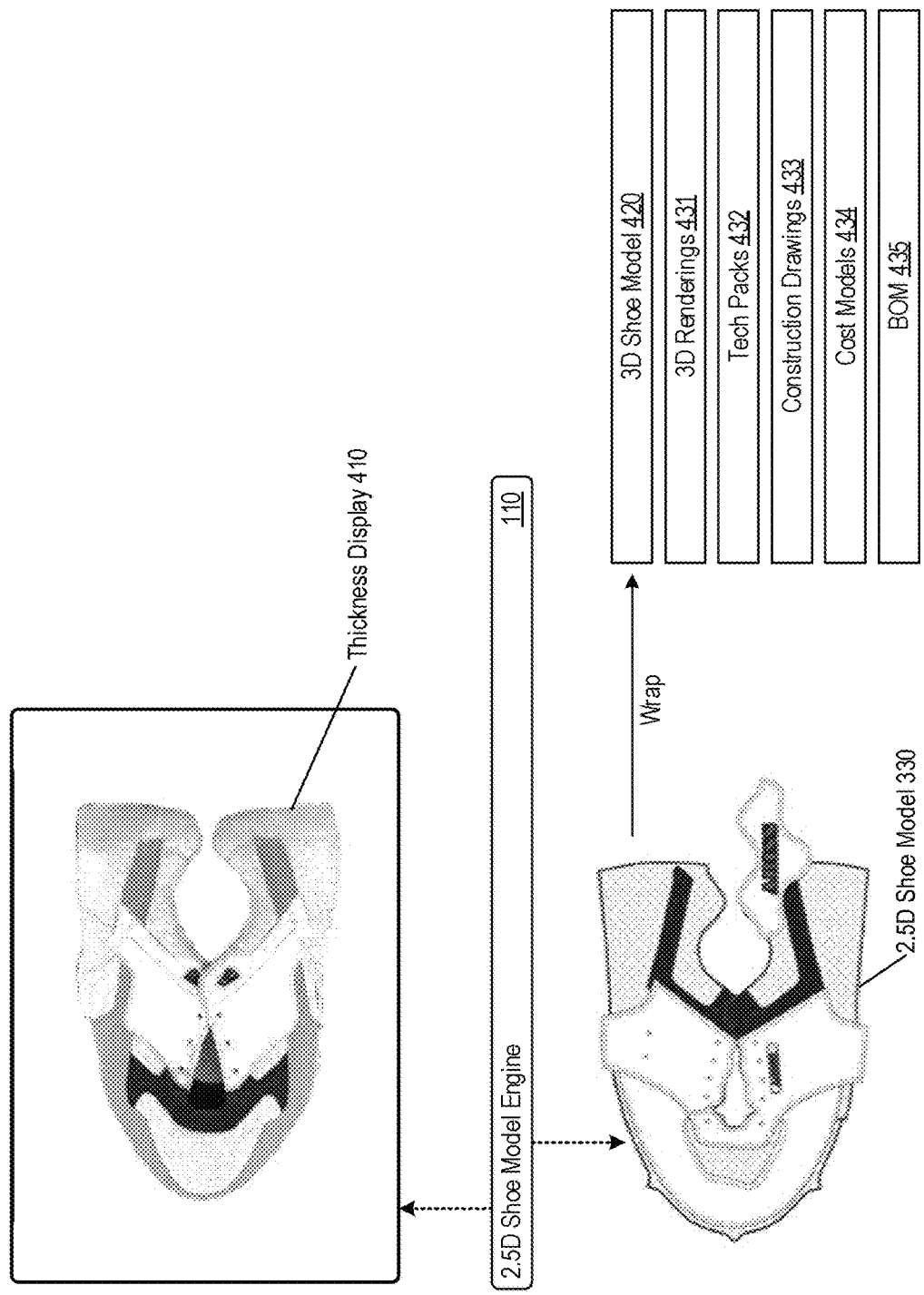
FIG. 4 shows an example of a thickness display and 3D wrapping processes that the 2.5D shoe model engine may apply to a 2.5D shoe model.

FIG. 4 shows an example of a thickness display and 3D wrapping processes that the 2.5D shoe model engine 110 may apply to a 2.5D shoe model. In the particular example shown in FIG. 4, the 2.5D shoe model engine 110 generates a thickness display and performs a 3D wrapping for the 2.5D shoe model 330.

With regards to a thickness display, the 2.5D shoe model engine 110 generate a visualization of the 2.5D shoe model 330 that accounts for layering and thickness data of placed shoe design elements. In FIG. 4, the 2.5D shoe model engine 110 generates the thickness display 410 for the 2.5D shoe model 330. While the 2.5D shoe model 330 may take the form a 2D visualization (e.g., thickness and curvature data is tracked, but not visually shown), the thickness display 410 may depict the 2.5D shoe model 330 in a format such that shoe parts are visualized with 3D properties. Such 3D properties may include curvature for the shape of the shoe design at various positions in the shoe, thickness of shoe parts, layering of different design elements, etc.

To generate the thickness display 410, the 2.5D shoe model engine 110 may, in effect, render 2.5D shoe model data such that the 2D plane upon which the 2.5D shoe model 330 is generated from is visualized with 3D shoe properties. Thus, the 2.5D shoe model engine 110 may raise (through visual effects) respective portions of the 2.5D shoe model 330 according to thickness, curvature, and/or layering data to render the 2.5D shoe model 330 as the thickness display 410. The thickness display 410 may provide another view of the created shoe design, albeit in a form that is not yet wrapped into a 3D representation of how the designed shoe would appear upon physical construction.

The 2.5 shoe model engine 110 may convert the 2.5D shoe model 330 into a 3D representation. In the example shown in FIG. 4, the 2.5D shoe model engine 110 wraps the 2.5D shoe model 330 into a 3D shoe model 420 for construction of a physical shoe from the 3D shoe model 420 (though perhaps with subsequent design modifications prior to physical construction). By "wrapping" the 2.5D shoe model 330, the 2.5D shoe model engine 110 may map the 2.5D shoe model 330 into a 3D representation by layering the shoe surface represented by the 2.5D shoe model 330 into 3-dimensions. Such a process may also be referred to a "reverse mapping" of the 2.5D shoe model 330 into 3D, as the 2D shoe shell pattern upon which the 2.5D shoe model 330 is generated from may have been generated by a 3D-to-2D mapping (e.g., as described above).

The 2.5D shoe model engine 110 may wrap the 2.5D shoe model 330 such that each placed shoe design element is wrapped into the 3D shoe model 420. Such shoe design elements may include key lines, sew lines, and shoe parts (such as the key lines 311, sew lines 321, shoe parts 322, and shoe parts 331), each of which the 2.5D shoe model engine 110 may map into 3D as part of the wrapping process. In wrapping specific shoe design elements into 3D, the 2.5D shoe model engine 110 may identify relevant 2.5D shoe model data (such as thickness and layering data) and map the specific shoe design elements into 3D according to the applicable thickness and layering data. As such data may be stored as part of the 2.5D shoe model 330, the 2.5D shoe model need not guess, estimate, or proximate how shoe design elements placed in 2D will be constructed in 3D, as the 2.5D shoe model data may specify such 3D properties of the placed shoe design elements. Thus, tracked 2.5D shoe model data may facilitate construction of 3D representations of shoes designed from 2D design interfaces.

In wrapping the 2.5D shoe model 330 into the 3D shoe model 420, the 2.5D shoe model engine 110 may account for material data of the shoe design elements placed in the 2.5D shoe model 330, the material of the 2D shoe shell pattern upon which the 2.5D shoe model 330 is generated, or both. As noted above, material-specific complexities may cause distortions in 3D-to-2D mappings, which may likewise be prevalent in 2D-to-3D or 2.5D-to-3D mappings. The 2.5D shoe model engine 110 may account for such material-specific or geometry-specific distortions, and wrap the 2.5D shoe model 330 in a manner to reduce or eliminate such distortions. For instance, the 2.5D shoe model engine 110 may implement or access fiber simulations or CAD tools that may support or perform such operations, e.g., in a manner consistent with the 3D-to-2D mappings discussed above.

The 3D shoe model 420 generated by the 2.5D shoe model engine 110 may be in a 3D CAD format. In that regard, the 2.5D shoe model engine 110 may obtain a 3D shoe representation of a shoe designed with a 2D design interface (which may be preferable to shoe designers). Thus, the 2.5D shoe model engine 110 may provide the benefit of 3D CAD modeling while providing a flexible 2D-based design process preferred by shoe designers. The 3D shoe model 420 may form a 3D basis from which subsequent design revisions or processing is performed to support physical construction of the designed shoe.

For instance, the 2.5D shoe model engine 110 may generate various other forms of shoe data in connection with the physical construction of a designed shoe. The 3D shoe model 420 may serve as a 3D master model for a designed shoe, from which a manufacturing engineer or other party may create a physical prototype of the shoe. As such, the 2.5D shoe model engine 110 may generate relevant shoe data applicable to a 3D design (e.g., a 3D master model). Examples in FIG. 4 include 3D renderings 341 of a designed shoe, tech packs 432, construction drawings 433, cost models 434 or bills of material (BOM) 435 (e.g., based on the material data tracked for the shoe design elements that form the shoe design). The 2.5D shoe model engine 110 may automatically generate such data, which may include compiling relevant 2.5D shoe model data tracked during the design process to identify relevant materials, costs, quantities, or other measurable parameters for construction of the designed shoe.

In some implementations, the 2.5D shoe model engine 110 supports further shoe design or revisions from the 3D shoe model 420. Upon wrapping the 2.5D shoe model 330 into 3-dimensions, a designer (e.g., a CAD operator) may review the shoe design and make any further adjustments to the shoe design. Shoe adjustments may be for aesthetic purposes, to ensure design accuracy, or to support physical construction (e.g., aligning lace holes, sew lines, or other aspects of the shoe). 3D adjustments by the 2.5D shoe model engine 110 the 3D shoe model 420 may occur directly after wrapping from the 2.5D shoe model 330, after construction of a physical prototype, or as part of an iterative design process in which designers refine a shoe design upon review of 3D renderings, physical prototypes, or both.

As described above, a system may support shoe design through 2.5D shoe models. A 2D shoe shell pattern engine 108 and 2.5D shoe model engine 110 may provide shoe design capabilities via a 2D interface, which can be efficiently and effectively mapped to 3D. Such automated and intelligent mapping from 2.5D-to-3D may result in generation of 3D master shoe models with increased efficiency, while also providing shoe designers with preferred 2D design options. Moreover, the 2.5D shoe design features described herein may result in an overall reduction of required 3D CAD work, which may reduce resource consumption and increase operating efficiencies of computing systems or CAD tools used for shoe design.

Figure 5:
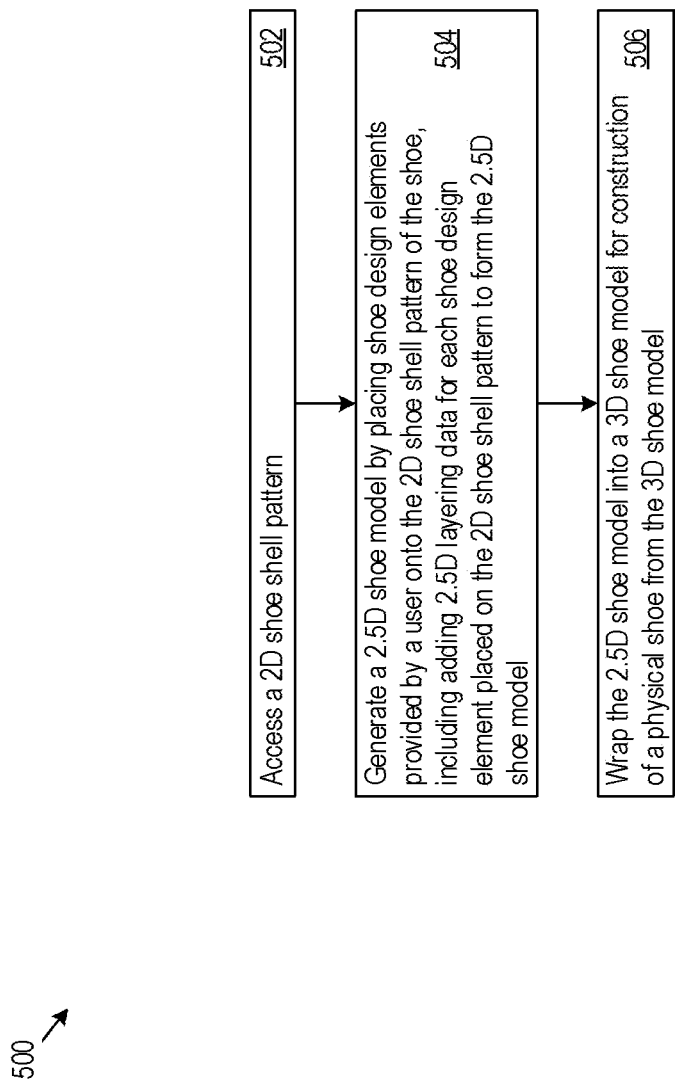
FIG. 5 shows an example of logic that a system may implement to support shoe design through 2.5D shoe models.

FIG. 5 shows an example of logic 500 that a system may implement to support shoe design through 2.5D shoe models. For example, the computing system 100 may implement the logic 500 as hardware, executable instructions stored on a machine-readable medium, or as a combination of both. The computing system 100 may implement the logic 500 via the 2D shoe shell pattern engine 108 and the 2.5D shoe model engine 110, through which the computing system 100 may perform or execute the logic 500 as a method to support shoe design through 2.5D shoe models. The following description of the logic 500 is provided using the 2D shoe shell pattern engine 108 and the 2.5D shoe model engine 110 as examples. However, various other implementation options by the computing system 100 are possible.

In implementing the logic 500, the 2D shoe shell pattern engine 108 may access a 2D shoe shell pattern (502). In some examples, the 2D shoe shell pattern engine 108 itself generates the 2D shoe shell pattern from a 3D shoe representation by unwrapping and flattening the 3D surface of a shoe into a 2D pattern. In any of the ways described herein, the 2D shoe shell pattern engine 108 may account for any number of material, curvature, or other characteristics of a 3D shoe representation in generating the 2D shoe shell pattern. As such, the 2D shoe shell pattern engine 108 may generate the 2D shoe shell pattern by flattening the 3D shoe representation into the 2D shoe shell pattern such that the flattening accounts for distortion caused by flattening a shoe material included in the 3D shoe representation.

In implementing the logic 500, the 2.5D shoe model engine 110 may generate a 2.5D shoe model by placing shoe design elements provided by a user onto the 2D shoe shell pattern of the shoe, including adding 2.5D layering data for each shoe design element placed on the 2D shoe shell pattern to form the 2.5D shoe model (504). Any additional or alternative 2.5D shoe model data may be tracked by the 2.5D shoe model engine 110 to generate the 2.5D shoe model. The 2.5D shoe model engine 110 may also wrap the 2.5D shoe model engine a 3D shoe model for construction of a physical shoe from the 3D shoe model (506), doing so in any of the ways described herein.

The logic 500 shown in FIG. 5 provides an example by which a computing system 100 may support shoe design through 2.5D shoe models. Additional or alternative steps in the logic 500 are contemplated herein, including according to any features described herein for the 2D shoe shell pattern engine 108, the 2.5D shoe model engine 110, or combinations of both.

Figure 6:
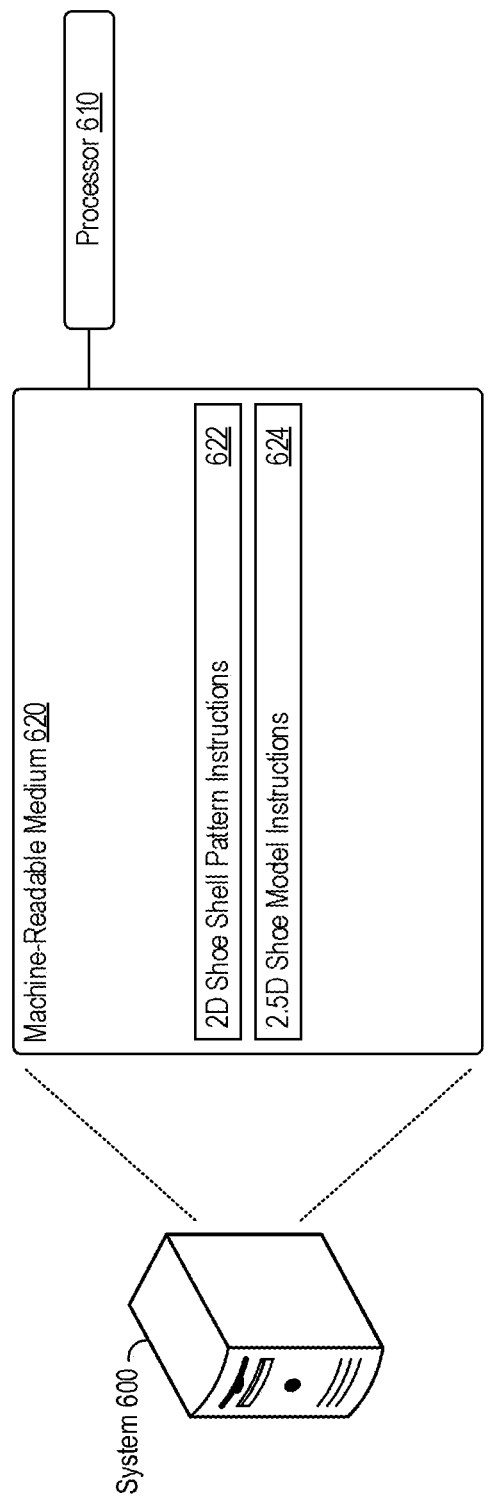
FIG. 6 shows an example of a system that supports shoe design through 2.5D shoe models.

FIG. 6 shows an example of a system 600 that supports shoe design through 2.5D shoe models. The system 600 may include a processor 610, which may take the form of a single or multiple processors. The processor(s) 610 may include a central processing unit (CPU), microprocessor, or any hardware device suitable for executing instructions stored on a machine-readable medium. The system 600 may include a machine-readable medium 620. The machine-readable medium 620 may take the form of any non-transitory electronic, magnetic, optical, or other physical storage device that stores executable instructions, such as the 2D shoe shell pattern instructions 622 and the 2.5D shoe model instructions 624 shown in FIG. 6. As such, the machine-readable medium 620 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 600 may execute instructions stored on the machine-readable medium 620 through the processor 610. Executing the instructions may cause the system 600 (or any other computing or CAD system) to perform any of the 2.5D shoe design features described herein, including according to any of the features with respect to the 2D shoe shell pattern engine 108, the 2.5D shoe model engine 110, or a combination of both.

For example, execution of the 2D shoe shell pattern instructions 622 by the processor 610 may cause the system 600 to access a 2D shoe shell pattern, the 2D shoe shell pattern generated for shoe design. Execution of the 2.5D shoe model instructions 624 by the processor 610 may cause the system 600 to generate a 2.5D shoe model by placing shoe design elements provided by a user onto the 2D shoe shell pattern of the shoe, including by adding 2.5D layering data for each shoe design element placed on the 2D shoe shell pattern to form the 2.5D shoe model, and wrap the 2.5D shoe model into a 3D shoe model for construction of a physical shoe from the 3D shoe model.

The systems, methods, devices, and logic described above, including the 2D shoe shell pattern engine 108 and the 2.5D shoe model engine 110, may be implemented in many different ways in many different combinations of hardware, logic, circuitry, and executable instructions stored on a machine-readable medium. For example, the 2D shoe shell pattern engine 108, the 2.5D shoe model engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the 2D shoe shell pattern engine 108, the 2.5D shoe model engine 110, or combinations thereof.

The processing capability of the systems, devices, and engines described herein, including the 2D shoe shell pattern engine 108 and the 2.5D shoe model engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
accessing a 2-dimensional (2D) shoe shell pattern, the 2D shoe shell pattern generated for shoe design;
generating a 2.5-dimensional (2.5D) shoe model by placing shoe design elements provided by a user onto the 2D shoe shell pattern of the shoe, wherein the placing comprises adding 2.5D layering data for each shoe design element placed on the 2D shoe shell pattern to form the 2.5D shoe model; and
wrapping the 2.5D shoe model into a 3-dimensional (3D) shoe model for construction of a physical shoe from the 3D shoe model.

2. The method of claim 1, wherein the 2.5D shoe model tracks layers of shoe design elements placed onto the 2D shoe shell pattern with an associated thicknesses of the tracked layers; and
wherein the 2.5D layering data added for a given shoe design element includes thickness data and material data for the given shoe design element.

3. The method of claim 2, wherein wrapping the 2.5D shoe model into the 3D shoe model comprises accounting for material data of the shoe design elements placed into the 2.5D shoe model.

4. The method of claim 1, further comprising generating the 2D shoe shell pattern by flattening a 3D shoe representation into the 2D shoe shell pattern such that the flattening accounts for distortion caused by flattening a shoe material included in the 3D shoe representation.

5. The method of claim 1, wherein the shoe design elements include key lines, sew lines, and shoe parts; and
wherein wrapping comprises wrapping the key lines, sew lines, and shoe parts placed on the 2D shoe shell pattern into the 3D shoe model.

6. The method of claim 1, further comprising adjusting the 3D shoe model wrapped from the 2.5D shoe model to address wrapping inconsistencies.

7. The method of claim 1, further comprising automatically generating renderings, tech packs, construction drawings, patterns, or cost modeling data from the 3D shoe model.

8. A system comprising:
a 2D shoe shell pattern engine configured to:
   access a 2-dimensional (2D) shoe shell pattern, the 2D shoe shell pattern generated for shoe design; and
a 2.5D shoe model engine configured to:
   generate a 2.5-dimensional (2.5D) shoe model by placing shoe design elements provided by a user onto the 2D shoe shell pattern of the shoe, including by adding 2.5D layering data for each shoe design element placed on the 2D shoe shell pattern to form the 2.5D shoe model; and
   wrap the 2.5D shoe model into a 3-dimensional (3D) shoe model for construction of a physical shoe from the 3D shoe model.

9. The system of claim 8, wherein the 2.5D shoe model tracks layers of shoe design elements placed onto the 2D shoe shell pattern with an associated thicknesses of the tracked layers; and
   wherein the 2.5D layering data added for a given shoe design element includes thickness data and material data for the given shoe design element.

10. The system of claim 9, wherein the 2.5D shoe model engine is configured to warp the 2.5D shoe model into the 3D shoe model comprises accounting for material data of the shoe design elements placed into the 2.5D shoe model.

11. The system of claim 8, wherein the 2D shoe shell pattern engine is further configured to generate the 2D shoe shell pattern by flattening a 3D shoe representation into the 2D shoe shell pattern such that the flattening accounts for distortion caused by flattening a shoe material included in the 3D shoe representation.

12. The system of claim 8, wherein the shoe design elements include key lines, sew lines, laces, and shoe lines; and
   wherein the 2.5D shoe model engine is configured to wrap the key lines, sew lines, laces, and shoe lines placed on the 2D shoe shell pattern into the 3D shoe model.

13. A non-transitory machine-readable medium comprising instructions that, when executed by a processor, cause a system to:
   access a 2-dimensional (2D) shoe shell pattern, the 2D shoe shell pattern generated for shoe design;
   generate a 2.5-dimensional (2.5D) shoe model by placing shoe design elements provided by a user onto the 2D shoe shell pattern of the shoe, including by adding 2.5D layering data for each shoe design element placed on the 2D shoe shell pattern to form the 2.5D shoe model; and
   wrap the 2.5D shoe model into a 3-dimensional (3D) shoe model for construction of a physical shoe from the 3D shoe model.

14. The non-transitory machine-readable medium of claim 13, wherein the 2.5D shoe model tracks layers of shoe design elements placed onto the 2D shoe shell pattern with an associated thicknesses of the tracked layers; and
   wherein the 2.5D layering data added for a given shoe design element includes thickness data and material data for the given shoe design element.

15. The non-transitory machine-readable medium of claim 14, wherein the instructions to wrap the 2.5D shoe model into the 3D shoe model include instructions that cause the system to account for material data of the shoe design elements placed into the 2.5D shoe model.

16. The non-transitory machine-readable medium of claim 13, wherein the instructions, when executed, further cause the system to generate the 2D shoe shell pattern by flattening a 3D shoe representation into the 2D shoe shell pattern such that the flattening accounts for distortion caused by flattening a shoe material included in the 3D shoe representation.

17. The non-transitory machine-readable medium of claim 13, wherein the shoe design elements include key lines, sew lines, and shoe parts; and
   wherein the instructions to wrap the 2.5D shoe model into the 3D shoe model include instructions that cause the system to wrap the key lines, sew lines, and shoe parts placed on the 2D shoe shell pattern into the 3D shoe model.

18. The non-transitory machine-readable medium of claim 13, wherein the instructions, when executed, further cause the system to adjust the 3D shoe model wrapped from the 2.5D shoe model to address wrapping inconsistencies.

19. The non-transitory machine-readable medium of claim 13, wherein the instructions, when executed, further cause the system to automatically generate renderings, tech packs, construction drawings, patterns, or cost modeling data from the 3D shoe model.

* * * * *